Nov. 17, 1953　　　　D. M. YENNI ET AL　　　　2,659,181
PROCESS OF AND APPARATUS FOR FORMING STYLUS-LIKE
ARTICLES FROM CORUNDUM OR SPINEL
Filed Jan. 30, 1947
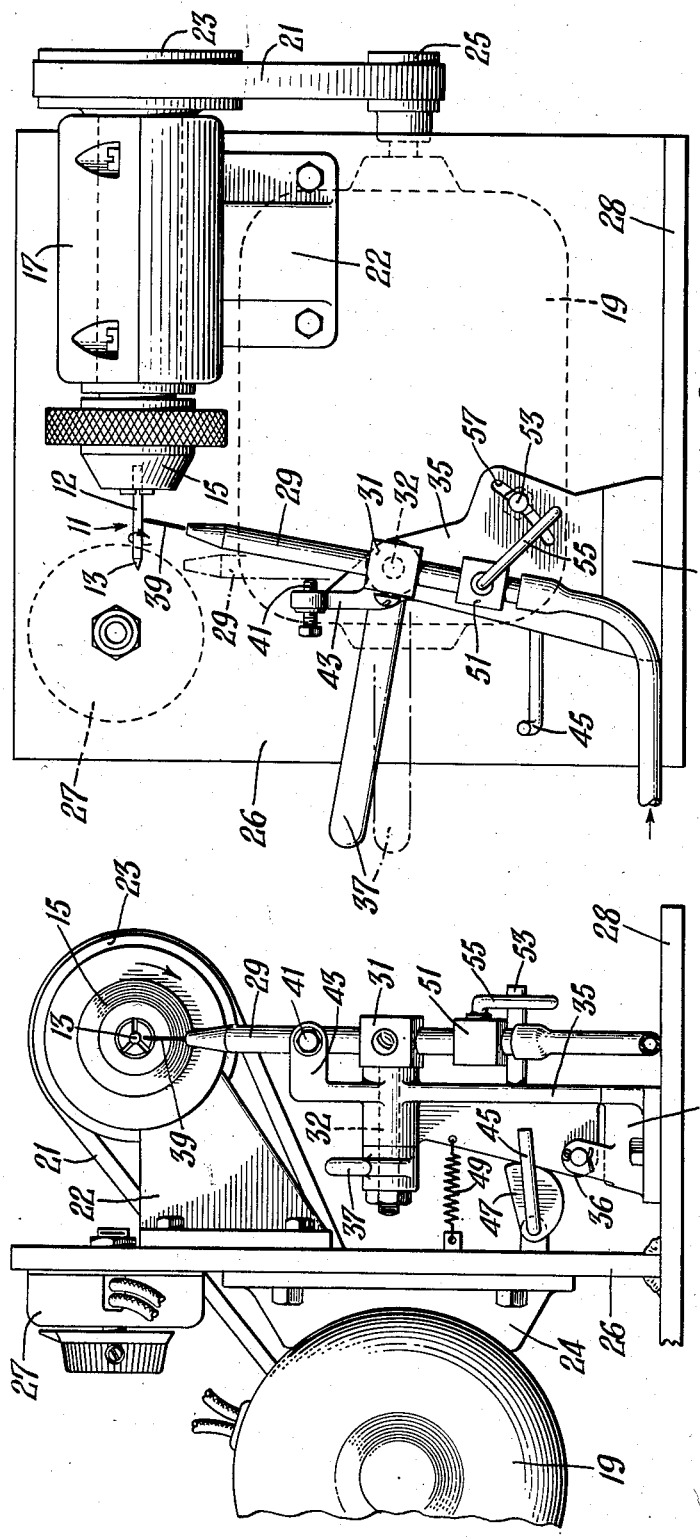
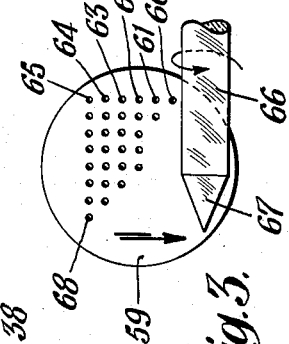
INVENTORS
DONALD M. YENNI
THOMAS F. HART
BY
ATTORNEY

INVENTORS
DONALD M. YENNI
THOMAS F. HART
BY
ATTORNEY

Patented Nov. 17, 1953

2,659,181

UNITED STATES PATENT OFFICE 2,659,181

PROCESS OF AND APPARATUS FOR FORMING STYLUSLIKE ARTICLES FROM CORUNDUM OR SPINEL

Donald M. Yenni, Williamsville, and Thomas F. Hart, Buffalo, N. Y., assignors, by mesne assignments, to Union Carbide and Carbon Corporation, a corporation of New York Application January 30, 1947, Serial No. 725,300

11 Claims. (Cl. 49—7)

This invention relates to a novel process and apparatus for thermally working non-combustible precious and semi-precious stone bodies such as rubies and sapphires (both being varieties of corundum), and spinel, as by shaping and glossing them. More particularly, the invention concerns a process for rapidly, inexpensively, and controllably forming smooth, glossy, and scratch-free rounded ends on thin rods or other bodies of such stones. Our novel process has special importance for shaping glossy, smooth, scratch-free rounded ends on stylus-like bodies of such materials.

Another important part of our inventon is the provision of novel articles of manufacture comprising precious and semi-precious stone bodies having smooth, glossy, scratch-free, hard, and wear resistant rounded ends, such as recording and reproducing styli for phonograph records and the like, gauge contact points, pivots, and similar articles. Additionally, the invention relates to spheres of corundum and the manufacture thereof.

It has long been recognized that the great hardness and wear resistance of precious and semi-precious stones such as ruby, sapphire, and spinel render them far more suitable for some uses than the more readily available materials which have been adopted commercially, but principally because of the high cost of mechanical cutting and grinding methods they have not supplanted more readily available and less costly materials. The articles mentioned in the preceding paragraph exemplify such uses.

There has recently been developed an important new procedure for growing synthetic single crystals of corundum (rubies and sapphires) and spinel in the form of long thin rods of controlled diameters which, in the case of corundum, have been as large as three-sixteenth inch and as small as 0.030 inch, although even thinner rods can be grown. In the "as grown" condition the peripheral surfaces of such rods are slightly irregular and have a frosted appearance due to the presence of small crystal projections. The frosted surfaces make objects viewed through such rods somewhat hazy so that they may be considered translucent. An article manufactured from corundum rod retains the central longitudinal growth axis of the original rod, whereas an article made from the ordinary split corundum boule does not. Such rods have opened up a wide new field for the application of hard, wear resistant corundum and spinel single crystals to replace other less satisfactory materials for many uses because they can be properly shaped at low cost with comparatively little cutting and grinding to form such articles as recording and reproducing styli, pivots, spheres, and gauge contact points.

Prior to the present invention it was necessary to shape such rods mechanically with abrasive wheels containing diamond particles to give them the rounded ends necessary for the above mentioned uses. Mechanical shaping is not only expensive, slow, and laborious, but is especially undesirable because the resulting surfaces have many minute scratches due to the scouring action of the abrasive particles, and also are apt to contain embedded diamond particles. Both embedded diamond particles and scratches create substantial frictional resistance to the movement of bodies moving in contact with stones and cause relatively rapid wear of such bodies. Also important is the fact that scratches decrease strength by acting as focal points for stress concentration leading to failure at relatively small loads.

The principal object of our invention is the provision of a novel process for rounding surfaces of non-combustible unicrystalline precious and semi-precious stones which overcomes the disadvantages of the prior art. Other objects are to provide such a process which is particularly advantageous for rounding the end of a styluslike stone article; which permits excellent control of curvature when rounding a surface of such a stone; and which can both gloss and round the surface of such a stone in one operation. Another object is the provision of a process for thermally glossing a precious or semi-precious stone rod in such a way that the peripheral surface is fully glossed while maintaining a relatively unrounded edge at the junction of the peripheral surface with the end surface. Still another object is to provide a process for forming a sphere from a rod of corundum or spinel.

Still other objects are to provide: precious and semi-precious stone bodies having rounded end surfaces of controlled size which have a lower frictional effect, less tendency to wear away bodies moving in contact therewith, and greater strength than mechanically shaped bodies; novel styli consisting of unitary bodies of unicrystalline synthetic corundum or spinel having either or both ends tapered and terminating in rounded end surfaces having the foregoing desirable characteristics; and novel gauge contact points, pivots, and recording and reproducing styli comprising thin rods having rounded end surfaces with the foregoing desirable characteristics.

Still other objects are to provide novel apparatus for rapidly and economically thermally working precious and semi-precious stone bodies in accordance with the process of the invention; to provide such apparatus suitable for both heat-glossing and rounding such stone bodies; and to provide such apparatus which is especially suitable for thermally rounding the ends of stylus-like articles in a controlled manner.

The above and other objects, and the novel features of the invention, will become apparent from the following description having reference to the annexed drawings, wherein:

Fig. 1 is a side elevational view of one form of apparatus suitable for performing the process of the invention;

Fig. 2 is a front elevational view of the apparatus shown in Fig. 1;

Fig. 3 is an enlarged plan view showing schematically a heating device arranged to perform a modified form of the process;

Figs. 4 and 5 are enlarged side elevational views of a part of a stylus-like article, before and after being thermally shaped;

Fig. 6 is an enlarged side elevational view showing a thermally shaped stylus tapered at both ends;

Figure 7:
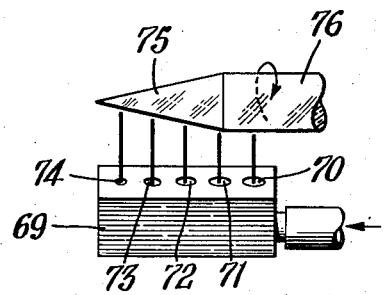
Fig. 7 is an enlarged side elevational view showing a heating device in position for rounding the end of a stylus by another modification of the process.

In a general way, our novel process comprises rounding the end of a unicrystalline body of corundum (e. g. sapphire or ruby), spinel, or other non-combustible precious or semi-precious stone by fusing an end portion of the body and maintaining it molten long enough to assume a convex shape with an approximately spherical surface. Thereafter, the molten portion is allowed to solidify by removing the source of heat, and the resulting article has a rounded end which is smooth, glossy, hard, abrasion resistant, and free from scratches and embedded diamond particles. Such a surface is hereinafter referred to as a heat glossed surface, for simplicity. Fusion can be accomplished in any suitable way, as by heating the body in an electric arc, a furnace, or any oxy-gas flame, but we prefer an oxy-gas flame. The length of the heating period for any desired shape is determined empirically by the operator, but subsequent identical bodies can be shaped with an identical heating schedule. This general procedure can be varied considerably within the scope of the invention and several variations will be described in detail hereinafter by way of illustration.

One of the most important uses of our novel process which has appeared to date is for forming a rounded end or apex on the tapered part of a stylus-like article, such as a phonograph or other sound track recording and reproducing needle which is tapered at one or both ends. First, a thin rod of corundum or spinel is selected, and where an exactly uniform diameter is necessary the rod is ground to the desired diameter in a centerless grinder. Then the end portion of the ground or unground rod is tapered by mechanical grinding to a sharp or slightly blunt apex, depending on how large a radius is required for the rounded end. A slightly blunt apex also is often formed by first tapering the rod to a sharp point and then blunting the sharp point with a grinder, or a large number of tapered styli can be tumbled together to blunt their points. Following this the tapered part is heated intensely to melt the material immediately adjacent to and including the apex is such a way that the molten material is drawn into the desired curved surface. To assure a symmetrical shape it is preferable, but not absolutely necessary, to rotate the rod on its longitudinal axis during the heating operation.

In one easily controlled procedure the heating medium, such as an oxy-fuel flame, is not applied directly to the apex but is applied to a region on the tapered surface spaced slightly from the apex in such a way that the material of the apex is heated indirectly by heat transfer from the directly heated region so as to avoid excessive melting and rounding of the apex. In this way, a heat glossed rounded end of small radius is formed which joins smoothly and continuously with the tapered surface. However, under careful control the apex can be heated directly in the flame. To avoid thermal shock it is desirable to start the heating on a part of the stylus remote from the apex, such as the shank, and to advance the heat gradually closer to the end, the advance being halted just short of the apex, or at the apex if desired. If the peripheral surface of the stylus is rough it becomes heat glossed during the heating step. Generally, however, a long rod is heat glossed in advance along its entire peripheral surface and is then divided into a plurality of short lengths which are thermally shaped individually as described above.

When performing on corundum the preferred procedure described above it is desirable that each rod selected for treatment be of such a character that its angle of optic orientation plus one-half the angle included by the desired tapered surface does not exceed 70 degrees. If the sum of such angles exceeds 70 degrees, a longitudinally extending series of small notches forms along one side of the tapered surface. The more the sum of such angles exceeds 70 degrees, the larger are the notches. For example, if a cone including a 40 degree angle is desired, the maximum c-axis orientation of the original rod selected must be no greater than 50 degrees if notching is to be avoided. Notching is principally undesirable from the standpoint of appearance, and not service. By the angle of optic orientation or c-axis orientation is means the angle between the optic or c-axis of the unicrystalline corundum rod and the longitudinal axis of the rod.

One form of apparatus suitable for performing our process is shown in Figs. 1 and 2 as used for rounding the sharp apex of a corundum or spinel stylus 11 of the type shown in Fig. 4 to produce the rounded shape shown in Fig. 5. The stylus 11 has a main body or shank 12 ground to a cylindrical shape and integral with a ground conically tapering portion 13 which terminates in a sharp point. The shank 12 is secured horizontally in a chuck 15 which is journalled in a bearing 17 for rotation by an electric motor 19 driving a belt 21 which runs on sheaves 23 and 25. Brackets 22 and 24 secure the bearing 17 and motor 19, respectively, to opposite sides of an upright 26 projecting from a bed plate 28. A rheostat 27 also is mounted on the upright 26 and connected with the motor 19 for regulating the speed of rotation of the stylus 11. For heating the stylus an oxy-fuel burner 29 is adjustably mounted in a holder 31 carried on one end of a shaft 32 extending horizontally at right angles to the bearing 17 and journalled in a vertical standard 35. Standard 35 is hinged at 36 to a base 38 to swing in a plane normal to the journal 17 for moving the burner into and out of heating position. A lever 37 is secured to the opposite end of the shaft 32 for moving or rocking the tip of the burner 29 in a vertical plane parallel to or including the longitudinal axis of the stylus 11.

In operation the burner 29 is so positioned by the operator that the flame 39 (all flames are represented in the drawings by single lines for simplicity, but it is evident that a multiflame burner can be used) impinges against the surface of the shank 12 on any selected zone spaced from the tapered portion 13 so as to preheat an initial narrow peripheral surface zone as the stylus rotates with the chuck 15. A rotational speed of about 300 R. P. M. is satisfactory, but lower or higher speeds can be used successfully. Successive peripheral zones approaching the point thereafter are progressively heated by manipulating the lever 37 so as to move the tip of the burner 29 and the flame 39 continuously lengthwise of the rod toward the point. If the surface is rough the flame is advanced slowly enough to form a smooth and glossy surface by heat glossing. When the burner 29 reaches a position such that the flame 39 impinges on a peripheral zone just short of the apex or point of the tapered portion 13, as represented by the line $a$—$a$ in Fig. 4, it strikes an adjustable stop bolt 41 in an arm 43 on the top of the standard 35 and is held stationary until the material immediately adjacent to and including the point has melted and assumed a rounded shape to form a product such as that shown in Fig. 5 wherein the rounded end 40 has a heat-glossed surface which merges continuously with the surface of the tapered part 13. Stop bolt 41 can also be adjusted to stop movement of the torch when the apex itself is in the flame. It is apparent that in this procedure relative movement between the stylus and the burner can also be effected by moving the stylus while holding the burner stationary.

At the moment when the operator observes that the apex of the stylus 11 has assumed the proper degree of roundness, he raises a lever 45 which rotates a cam 47 in a counterclockwise direction away from the hinged standard 35 and permits a tensed spring 49 to retract the standard through an arc to withdraw the tip of the burner 29 and the flame 39 from the stylus 11 in a direction transversely thereof. When the next stylus is to be shaped, the operator simply turns the lever 45 in a clockwise direction to force the cam 47 against the standard 35 and restores the burner 29 to heating position.

Upon completion of the procedure described above the whole surface of an originally rough stylus will have been heat glossed simultaneously with the shaping operation, except for the short length within the chuck 15. This also can be heat glossed either by reversing the position of the stylus and applying the flame 39, or by removing the stylus from the chuck and manually applying a flame to the unglossed section.

In order to prevent the formation of an excessively large rounded apex on the stylus 11, it is advantageous to heat the cylindrical shank portion 12 with substantially constant intensity, but to decrease gradually the intensity with which the stylus is heated as the flame moves toward the point over the successively smaller diameter zones on the tapered part 13. This can be accomplished in any suitable way, as by manually operating a valve 51 to decrease the flow of the combustible gas mixture to the burner 29, or by moving the burner gradually farther away from the stylus during traverse of the flame over the tapered end 13. One way for accomplishing the latter is to pivot the burner 29 at a point much closer to the tip than shown in Figs. 1 and 2. However, it is most desirable that the flame be controlled automatically so as to avoid errors in the judgment of the operator. For this purpose a pin 53 is adjustably bolted or otherwise mounted in an arcuate slot 57 in the standard 35 and projects therefrom in such a position that the valve lever 55 will abut against the pin at the moment when the flame 39 reaches the tapered part 13. Continued movement of the burner 29 toward the point thereafter causes the valve 51 to close further and gradually decreases the flame intensity. Variations in the position at which closing of the valve 51 begins can be obtained by adjusting the pin 53 to any desired position within the arcuate slot 57.

When thermally shaping a stylus which has been tapered to a point at both ends by grinding, approximately half the stylus is treated by a flame in the manner described above. Then the stylus is reversed in the chuck 15 and the remainder is treated in an identical manner. Such a stylus 58 having two tapered thermally rounded ends is shown in Fig. 6.

As an example of the foregoing procedure, a synthetic clear unicrystalline sapphire rod of 0.1 inch diameter with a 40° cone ground on the end to form a stylus was thermally shaped and heat glossed by applying an oxy-natural-gas flame jet (3 cu. ft./hr. from a No. 60 drill hole orifice) to the rotating cylindrical shank of the stylus, moving the flame progressively toward the apex of the cone over a period of about fifteen seconds as successive peripheral zones were preheated and heat glossed until a terminal zone just short of the apex was reached, stopping movement of the flame, and applying the flame to the terminal zone for about half a second to form on the stylus a rounded end having a .006 inch diameter, of the character shown at 40 in Fig. 5.

Stylus-like articles produced by the above-described process are highly advantageous for gauge points, pivots, and phonograph recording and reproducing styli because of their great wear resistance and the low frictional effect of the smooth heat-glossed surfaces from which any diamond particles that may originally have been present have been burned out. A low frictional effect is desirable to increase the durability of phonograph records or other objects moving relatively to a stylus by reducing the abrasiveness of the hard stylus material. Stylus-like articles thermally shaped by the process of the invention also are characterized by greatly increased strength due to elimination of the notch effect caused by scratches formed by mechanical grinding and polishing, or caused by the surface irregularities existing on synthetic gems in the "as grown" condition. For example, heated glossed synthetic corundum rods had an average tensile strength of 102,000 lbs./sq. in. compared with 67,000 lbs./sq. in. for similar rods in the "as grown" condition. Corundum pivots have exhibited a high shear strength in tests, and this material is additionally of special advantage for pivots in high temperature service because of its high resistance to galling. Unitary phonograph styli of sapphire, spinel, and like materials are produced so inexpensively by our novel procedure that it is now commercially feasible to make styli large enough to be secured directly to the stylus bar of a phonograph. However, the principles of the invention also apply to forming extremely short needle points which are fitted into metal shanks to form composite phonograph needles.

The specific procedure described in detail above is especially advantageous when the included angle of the tapered part of a stylus is 40° or larger. However, when the included angle is less than 40° it is difficult to obtain good results with a single heating flame because the material at the point tends to be drawn toward the base of the tapered part, thus leaving a tip which is too long and fragile for many uses. One procedure which has been used successfully for thermally rounding the apices of styli including angles both greater and smaller than 40° is illustrated in Fig. 3. A burner head 59 has a plurality of orifices arranged in a series of parallel rows 60 to 65 of successively greater length such that each row extends beyond one end of the preceding row and an approximately right triangular pattern is formed. A rotating stylus 66 is positioned substantially parallel to the orifice rows 60 to 65 in such a way that the hypotenuse of the right triangle is inclined away from the stylus in the direction of the tapered end 67. Movement of the burner head 59 across the stylus 66 in the direction of the arrow causes first the flame from the orifice 60 at an apex of the triangle, and then successively longer rows of flame jets, to impinge against the stylus so that different flame jets impinge against successive peripheral zones starting with an initial zone on the shank and approaching the apex of the tapered end 67. The final flame jet from the end orifice 68 of the last row 65 impinges against a terminal zone which is spaced slightly from the point of the stylus to heat the point indirectly, thereby forming a small rounded apex smoothly and continuously joined to the tapered surface 67 in the manner shown in Fig. 5. When the apex is to be heated directly, head 59 is so positioned that the final flame jet impinges against the apex.

Styli also have been successfully thermally rounded and glossed with a multiple flame burner head having a series of orifices of graduated size positioned to direct successsively smaller flames against the successively smaller diameter sections of the stylus in such a way that the smallest flame impinges against a terminal peripheral zone spaced from the tip, or against the tip itself when desired. This procedure is illustrated in Fig. 7, which shows a burner head 69 arranged in such a position that flames of decreasing size and heating intensity from the successively smaller orifices 70 to 74 impinge against the shank and the tapered surface 75 of the stylus 76 as the latter rotates in suitable mechanism of the character shown in Figs. 1 and 2.

Figure 8:
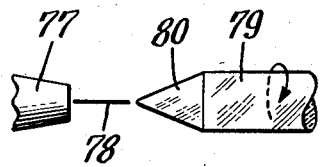
Fig. 8 is an enlarged view showing a heating device in position for rounding the end of a stylus by still another modification of the process.
Figure 9:
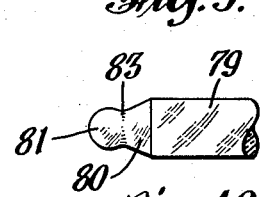
Figs. 9 and 10 are enlarged side elevational views showing two variations in the shapes of stylus-like articles thermally shaped as shown in Fig. 8.

Still another procedure for rounding off the point of a stylus-like body of a precious or semi-precious stone involves the direct heating of the point, in the manner shown in Fig. 8 wherein a burner 77 is arranged to direct its flame 78 axially against the point of a stylus 79 having a tapered surface 80. A symmetrical rounded apex is produced by rotating the stylus on its longitudinal axis during the heating period. As in the previously described procedures, application of the flame 78 is continued until enough material adjacent to and including the point has been melted to form a substantially spherical surface of the desired size, as judged by the operator, whereupon the heating is discontinued. As shown in Fig. 9 a stylus resulting from this procedure has a bulbous, partially spherical heat-glossed end 81 of greater diameter than the immediately adjacent portion of the tapered surface 80 and joined thereto by a sharp fillet 82. Little or no glossing of the tapered surface occurs during this procedure because the flame is concentrated at the point. Application of the previously mentioned oxy-natural gas flame for about one second is sufficient to form a .01 inch diameter ball on a 0.1 inch diameter sapphire stylus.

The sharp fillet 82 on the stylus 79 is undesirable for some uses because it may induce fracture under stress. By heating the annular area of surface adjacent to and including the fillet 82 sufficiently to smooth out the fillet and provide a smooth, heat-glossed, continuous junction 83 of the bulb 81 with the tapered surface 80, the resistance to fracture is greatly increased. This can be accomplished by directing a flame laterally against the fillet while rotating the stylus on its longitudinal axis. If the peripheral surface of the rod also is to be heat-glossed, the flame can be applied initially against a zone remote from the fillet and advanced progressively toward the end. To avoid overheating it is advantageous to decrease the heating intensity of the flame gradually during its traverse over the tapered surface 80. Using the oxy-natural gas flame previously described the fillet formed by a .01 inch diameter ball on a 0.1 inch diameter sapphire rod was rounded as shown in Fig. 9 by applying the flame for about three seconds against the fillet zone 82.

Figure 11:
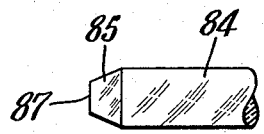
Figs. 11 and 12 are enlarged side-elevational views showing a thin rod before and after having the end thermally rounded to a diameter approximately equal to the diameter of the rod.
Figure 12:

Another embodiment of the process of the invention involves the thermal shaping of a rod of material such as corundum or spinel in such a way as to form an article such as a pivot or gauge contact point having a hemispherical heat-glossed end surface 88 having a diameter substantially equal to the diameter of the rod itself and smoothly joined to the peripheral surface of the rod, as shown in Fig. 12. This can be accomplished by bevel grinding a rod 84 to form a blunt tapered surface 85 of frusto-conical shape terminating in a flat front end 87, as shown in Fig. 11. It is desirable that the tapered surface include an angle between 40° and 60° and that the height of the frustum be approximately equal to the desired radius. The forward edge of the tapered surface 85 also is sometimes beveled slightly to assure that the correct shape will be obtained. An intensely hot flame is then applied either directly against the end 87 or against the surface 85 while rotating the rod, and the material thus melted is maintained in a state of fusion for a sufficient length of time to assume a substantially hemispherical shape. About one minute is sufficient to form a 0.1 inch diameter hemispherical end on a sapphire rod of like diameter, using the oxy-natural gas flame previously mentioned.

If a full sphere is wanted, the rod can be severed by cutting it or nicking with a diamond point and then breaking it at d—d, which is just inside the circumference of the desired sphere. Then the rough end of the severed piece is rounded in a flame to complete the shape of a full sphere. A full sphere can also be made by starting with a short length of rod whose length is the same as the diameter of the desired sphere, and then flame rounding both ends successively.

Figure 13:
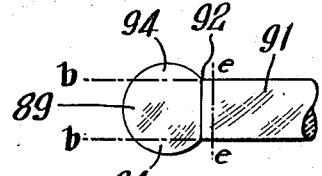
Fig. 13 is an enlarged side elevational view showing a rod having a thermally shaped bulbous end.
Figure 10:
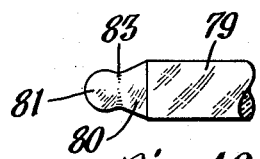

For some purposes, a glossy, scratch-free bulbous end 89 of generally spherical shape is desired on the end of a cylindrical rod 91, as in Fig. 13. This can be obtained by heating and melting the end of a rod either by directing a flame longitudinally against the end or laterally against the portion of the rod adjacent to the end. A sufficient length is melted and a sufficiently long heating time is provided, as judged by the operator, so that a bulbous spherical shape of the desired radius forms, whereupon heating is discontinued. If necessary, the sharp fillet 92 between the bulb 89 and the main body of the rod can be smoothed out by a heating flame to form a smooth and continuous junction, in the manner described in connection with Figs. 9 and 10.

Figure 14:
Fig. 14 is an enlarged side elevational view of a rod having a thermally rounded end with a radius greater by a substantial amount than the main body of the rod.

The rod 91 having a large bulbous end 89, is useful for various types of pivots and gauge contact points. However, some gauge contact points and pivots must be of substantially uniform diameter throughout their lengths and must have only a relatively small convex end surface of radius greater than that of the rod, as shown at 93 in Fig. 14. Such an article can be manufactured by grinding from the bulbous end 89 of the rod 91 shown in Fig. 13 the ring of excess material 94 which extends laterally beyond the projection b—b of the main body or shank. The ground rod can then be heat glossed by applying thereto a flame or other suitable heating medium. This is especially desirable when the peripheral surface of the rod must be used as a bearing surface of a pivot.

Another procedure is to remove the bulbous end 89 from rod 91 by cutting it off adjacent its base as on the line e—e which is just inside the circumference of the desired sphere, or by nicking the rod at e—e with a diamond point and then breaking off the sphere. The rough fractured or cut surface then can be ground or flame polished and an almost perfectly spherical ball is obtained which can be used in jewelry.

Figure 15:
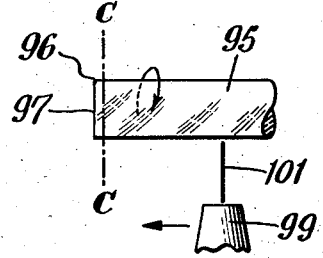
Fig. 15 is an enlarged side elevational view showing a heating device in position for performing still another modification of the process.

Fig. 15 illustrates still another modification of the process of the invention, whereby the peripheral surface of a substantially cylindrical rod 95 of material such as corundum or spinel is heatglossed without substantially rounding the sharp edge 96 between the end 97 and the peripheral surface. Successive peripheral zones of the surface are heated starting at an initial zone remote from the end 97 and approaching the end, as by an oxy-natural gas burner 99 moving lengthwise of the rod while the latter rotates on its longitudinal axis. Movement of the burner 99 is discontinued at a terminal zone spaced a short distance from the end, as at c—c, and the flame 101 is held on that zone for a sufficient length of time to extend the heat glossing action of the flame completely to the edge 96 while avoiding melting and substantial rounding of the edge.

In all of the procedures described herein, it is probable that heat glossing involves melting of the rough crystal projections or other raised surface portions in such a way that the melted portions coalesce into a smooth glossy surface. In any event, it is clear that the material is formed into a smooth and glossy surface.

The foregoing description of specific embodiments of our invention has been by way of example only. It is to be understood that changes in the construction and arrangement of parts of the apparatus, and changes in the details of the process can be made by persons skilled in the art within the scope of the invention as defined by the appended claims.

This application is a continuation-in-part of our application Serial No. 567,952 filed December 13, 1944, now abandoned.

We claim:

1. A process for producing a stylus, pivot, or like article having a rounded glossy scratch-free end surface which is highly resistant to friction and wear, such process comprising providing a rod-like non-combustible body of one of the materials selected from the group consisting of corundum and spinel; grinding an end portion of said body to a taper having an apex; and rotating said rod-like body about its longitudinal axis while applying sufficient heat to such apex to melt the same superficially and cause the surface thereof to assume a convex shape.

2. A process for producing a stylus, pivot, or like article having a glossy-scratch-free smooth tapered end portion terminating in a rounded glossy scratch-free apex which is highly resistant to friction and wear, such process comprising providing a unicrystalline rod of corundum, grinding an end portion of said rod to a taper which includes an angle such that the angle of optic orientation of such rod plus one-half the angle included by such taper does not exceed 70 degrees, and applying sufficient heat to said tapered end portion to melt the same superficially and cause the apex thereof to assume a convex shape.

3. A process for forming a stylus-like article having a rounded end from a body of one of the materials selected from the group consisting of corundum and spinel, said process comprising grinding an end portion of said body to a taper having an apex, and melting material adjacent to and including said apex by heating said material whereby the molten material is drawn into a curved surface.

4. A process according to claim 3 wherein heating is accomplished by applying a flame directly to said apex.

5. A process according to claim 3 wherein heating is accomplished by applying a flame directly only to a region spaced from said apex while rotating said body around the longitudinal axis of said taper, and the material of said apex is heated indirectly by heat transfer from said region.

6. A process for forming a stylus-like article having a rounded end from a body of one of the materials selected from the group consisting of corundum and spinel having a part tapering to an apex, said process comprising rotating said body around the longitudinal axis of said tapering part while applying flame to said body on successive peripheral zones starting with an initial zone remote from said apex and approaching said apex, such flame heating said body with decreasing intensity as it is applied to successively smaller diameter zones on said tapered part, and discontinuing the application of such flame when the material adjacent to and including said apex melts and is drawn into a curved surface.

7. A process for forming an article having a bulbous rounded end from a body of one of the materials selected from the group consisting of corundum and spinel, said process comprising grinding one end of said body to a taper having an apex, rotating said body around the axis of said taper, directing a flame against said apex of said body along the longitudinal axis of said taper, melting material adjacent to and including the end of said body whereby the molten material is drawn into a bulbous mass having a curved surface, said mass having a larger diameter than the immediately adjoining portion of said body and forming therewith a sharp fillet, and applying a flame to a peripheral zone adjacent to and including said fillet to reduce the sharpness of said fillet and provide a smooth gradual juncture of said bulbous mass with the adjoining part of said body.

8. Apparatus for flame forming a stylus-like article having a rounded end from a body of corundum or spinel having a part tapering to an apex, said apparatus comprising a rotatable holder so constructed and arranged as to support such a body for rotation about the longitudinal axis of said tapering part of said body, means for applying to said body a flame of such a size as to heat only a narrow peripheral zone of said body, said means for applying said flame being pivotally mounted and movable relative to said holder in a direction lengthwise of said tapered part starting with an initial peripheral zone remote from said apex and approaching said apex to heat successive peripheral zones of said body, a device for reducing the heating intensity of said flame, means coacting with said device and operable automatically during such movement to operate said device as said flame is applied to successively smaller diameter zones on said tapered part, and means to be engaged by said means for applying said flame and stopping the movement of said latter means at a predetermined position of said flame relatively to said body.

9. A process for forming a stylus-like article having a rounded end from a rod of one of the materials selected from the group consisting of corundum and spinel, said rod comprising a shank and a tapered end terminating in an apex, said process comprising rotating said rod on the longitudinal axis thereof, and applying simultaneously to said shank and said tapered end a series of lateral flame jets of graduated heating intensity arranged longitudinally of said body, said jets having progressively less heating intensity toward said apex, and the flame jet nearest said apex being directed against a zone of said tapered end remote from said apex so as to melt said apex and draw the material thereof into a curved surface.

10. A process for forming a stylus-like article having a rounded end from a body of one of the materials selected from the group consisting of corundum and spinel, said process comprising grinding an end portion of said body to a taper having an apex, rotating said body around the longitudinal axis of said taper while applying flame to said body on successive peripheral zones starting with an initial zone remote from said apex and approaching said apex, heating said apex directly in said flame, and discontinuing application of said flame after said apex has been heated directly therein and has melted and been drawn into a curved surface.

11. A process for forming a stylus-like article having a rounded end from a roughly surfaced body of one of the materials selected from the group consisting of corundum and spinel, said process comprising grinding an end portion of said body to a taper having an apex, rotating said body around the longitudinal axis of said taper while applying flame to said body on successive peripheral zones starting with a zone remote from said apex and approaching said apex, advancing said flame toward said apex at a rate slow enough to heat-gloss said rough surface, and discontinuing the application of such flame at a terminal zone spaced from said apex whereby the material adjacent to and including said apex is heated indirectly, melts, and is drawn into a curved surface.

DONALD M. YENNI.
THOMAS F. HART.

References Cited in the file of this patent

UNITED STATES PATENTS

| Number | Name | Date |
| --- | --- | --- |
| 1,409,498 | Straight | Mar. 14, 1922 |
| 1,461,227 | Schwerin | July 10, 1923 |
| 1,680,681 | Herzog | Aug. 14, 1928 |
| 1,739,208 | Chaney | Dec. 10, 1929 |
| 1,912,405 | Ronci | June 6, 1933 |
| 2,018,056 | Delpech | Oct. 22, 1935 |
| 2,026,760 | Turner | Jan. 7, 1936 |
| 2,189,860 | Frei | Feb. 13, 1940 |
| 2,261,639 | Benner et al. | Nov. 4, 1941 |
| 2,320,416 | Dally | June 1, 1943 |
| 2,378,146 | Luertzing | June 12, 1945 |
| 2,405,892 | Lederer et al. | Aug. 13, 1946 |
| 2,423,094 | Gardner | July 1, 1947 |
| 2,469,681 | Coby | May 10, 1949 |
| 2,485,979 | McCandless et al. | Oct. 25, 1949 |
| 2,517,661 | Hart | Aug. 8, 1950 |
| 2,527,669 | Yenni et al. | Oct. 31, 1950 |

FOREIGN PATENTS

| Number | Country | Date |
| --- | --- | --- |
| 144,902 | Switzerland | Apr. 1, 1931 |
| 566,698 | France | Nov. 26, 1923 |

OTHER REFERENCES

"Synthetic Sapphire Production Reaches Commercial Scale in U. S.," reprint from Product Engineering, Oct. 1943 (pages 668-670).